(12) United States Patent
Downie et al.

(10) Patent No.: US 11,994,712 B2
(45) Date of Patent: May 28, 2024

(54) LOW LOSS AND LOW DISPERSION OPTICAL FIBER FOR DATA CENTER OPTICAL COMMUNICATION

(71) Applicant: CORNING INCORPORATED, Corning, NY (US)

(72) Inventors: John David Downie, Painted Post, NY (US); Ming-Jun Li, Horseheads, NY (US); Xiaojun Liang, Horseheads, NY (US); Hui Su, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/166,538

(22) Filed: Feb. 3, 2021

(65) Prior Publication Data

US 2021/0247564 A1 Aug. 12, 2021

Related U.S. Application Data

(60) Provisional application No. 62/969,395, filed on Feb. 3, 2020.

(51) Int. Cl.
*G02B 6/02* (2006.01)
*G02B 6/028* (2006.01)
(Continued)

(52) U.S. Cl.
CPC ..... *G02B 6/02028* (2013.01); *G02B 6/02395* (2013.01); *G02B 6/0281* (2013.01);
(Continued)

(58) Field of Classification Search
CPC ............ G02B 6/02028; G02B 6/02242; G02B 6/02395; G02B 6/0281; G02B 6/03644; H04B 10/25; H04B 10/564
See application file for complete search history.

(56) References Cited

U.S. PATENT DOCUMENTS 6,321,016 B1 * 11/2001 Tirloni ............... G02B 6/02009
359/341.1
7,269,349 B2 * 9/2007 Kinjo ................... H04B 10/297
398/92
(Continued)

FOREIGN PATENT DOCUMENTS

EP        1221779 A2 *  7/2002  .......... H04J 14/0206
WO    WO-2018160781 A1 *  9/2018  ............. H04B 10/25

OTHER PUBLICATIONS

Moog (Tactical Fiber Optic Modems EuroCom D/1 and ITU Standards, Feb. 2018) (Year: 2018).*
(Continued)

*Primary Examiner* — Ryan A Lepisto
(74) *Attorney, Agent, or Firm* — Yiqun Zhao

(57) ABSTRACT

In some embodiments, a data center optical communications system includes: a transmitter comprising a light source, wherein the light source is configured to provide light; an optical fiber operably connected to said transmitter and configured to receive light from the light source, wherein the optical fiber has a length L of 50 km or greater; a receiver configured to receive light from the optical fiber, wherein the receiver includes a detector for detecting the light, wherein the system has a power consumption of 15 W or less.

23 Claims, 8 Drawing Sheets

(51) Int. Cl.
*H04B 10/25* (2013.01)
*G02B 6/036* (2006.01)
*H04B 10/564* (2013.01)

(52) U.S. Cl.
CPC ......... *H04B 10/25* (2013.01); *G02B 6/02242* (2013.01); *G02B 6/03644* (2013.01); *H04B 10/564* (2013.01)

(56) References Cited

U.S. PATENT DOCUMENTS

| | | |
|---|---|---|
| 8,503,845 B2 | 8/2013 | Winzer et al. |
| 8,644,664 B2 | 2/2014 | Molin et al. |
| 8,977,125 B2 | 3/2015 | Grigoryan et al. |
| 9,515,767 B2 | 12/2016 | Frankel et al. |
| 10,313,014 B2 | 6/2019 | Frankel et al. |

OTHER PUBLICATIONS

Kahn et al., "Design of low-power DSP-free coherent receivers for data center links." Journal of Lightwave Technology 35, No. 21 (2017): pp. 4650-4662.

Kupfer wt al., "Optimizing power consumption of a coherent DSP for metro and data center interconnects." In Optical Fiber Communication Conference, pp. Th3G-2. Optical Society of America, 2017 3 pages.

Maniloff, E., et al., "400G and Beyond: Coherent Evolution to High-Capacity Inter Data Center Links", In Optical Fiber Communication Conference, pp. M3H-4. Optical Society of America, 2019, 3 pages.

Plant et al., "DSP-free 'coherent-lite'transceiver for next generation single wavelength optical intra-datacenter interconnects." Optics express 26, No. 7 (2018), 14 pages.

\* cited by examiner

LOW LOSS AND LOW DISPERSION OPTICAL FIBER FOR DATA CENTER OPTICAL COMMUNICATION

CROSS-REFERENCE TO RELATED APPLICATIONS

This application claims the benefit of priority under 35 U.S.C. § 119 of U.S. Provisional Application Ser. No. 62/969,395 filed on Feb. 3, 2020, the content of which is relied upon and incorporated herein by reference in its entirety.

FIELD

The present disclosure relates to optical fibers and in particular relates to low loss and low dispersion optical fibers for data centers.

BACKGROUND

The rapid growth of Internet applications have driven the optical network evolution for data centers, from 10 Gb/s optical systems in 2007 to the current/upcoming 400 Gb/s systems. Proliferation of social media and video streaming demands 400G networks. In the future, industry trends show that Internet of things (IoT) and machine learning based applications will require much more communication among massive number computers/servers, leading to stringent requirements on network capacity and efficiency.

The first challenge is to achieve high transmission capacity. For the past decade from 10G to 400G, various communication technologies have been selected based on technical feasibility as well as economic considerations. For intra-data center applications, optical systems have evolved in multiple aspects, including (i) symbol rate from 10 Gbaud to 25 Gbaud, (ii) modulation format from non-return-to-zero (NRZ) to pulse-amplitude modulation (PAM4), (iii) using coarse wavelength-division multiplexing (WDM) and parallel fibers, and (iv) using multimode fiber (MMF) and single mode fiber (SMF). For future data center interconnects (DCI), optical systems will employ coherent communication technologies and dense WDM (DWDM) with symbol rates increasing from 28 Gbaud to 60 Gbaud and modulation formats including quadrature phase shift keying (QPSK) and 16ary quadrature amplitude modulation (16-QAM). For future generations of 800G and 1.6T systems, a combination of different methods are required including increasing baud rate and modulation order, and adding more parallel lanes. There is a trend that coherent communication technologies are likely to be applied to intra-data center systems to increase capacity. Also, for DCI links, probabilistic constellation shaping (PCS) technology is very likely to be adopted. PCS provides both higher data capacity and finer data rate granularity and has been already implemented in a few commercial transponders.

A second significant challenge is to reduce the power consumption of optical transceivers. Due to the massive number of connections, network switches for within and between data centers need to accommodate a large number of optical transceivers. High port density in network switches is important to reducing system complexity and cost. This leads to rigorous restrictions on transceiver form factors, and therefore demanding heat dissipation challenges for transceivers. The current/upcoming 400G optical transceivers use octal small form factor pluggable (OSFP) and quad small form factor pluggable-double density (QSFP-DD). It is desired to limit transceiver power consumption to 15 W or less. The power consumption of a coherent transceiver results primarily from digital signal processing (DSP) and also from lasers, photodetector, amplifiers, modulators, digital-to-analogue converter, and analogue-to-digital converter. DSP power consumption is mainly from forward error correction (FEC), chromatic dispersion (CD) compensation, and polarization mode demultiplexing (PMD). One way to increase transceiver power efficiency is to use complementary metal-oxide-semiconductor (CMOS) technology with a fine feature size such as 7 nm, so that the entire DSP power is reduced. Industry trends shows that 7 nm CMOS technology will be used in 400G and higher data rate transceivers.

Accordingly, the inventors have provided a low loss and low dispersion optical fiber to increase data capacity and to reduce DSP power consumption for intra- and inter-data center optical interconnection systems.

BRIEF SUMMARY

In some embodiments, a data center optical communications system includes: a transmitter comprising a light source, wherein the light source is configured to provide light; an optical fiber operably connected to said transmitter and configured to receive light from the light source, wherein the optical fiber has a length L of 50 km or greater; a receiver configured to receive light from the optical fiber, wherein the receiver includes a detector for detecting the light, wherein the system has a power consumption of 15 W or less.

Other and further embodiments of the present disclosure are described below.

BRIEF DESCRIPTION OF THE SEVERAL VIEWS OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1A:
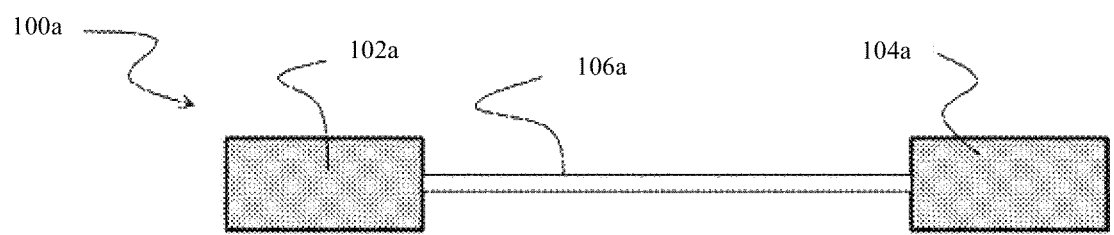
FIGS. 1A-1D schematically depict an optical communication system in accordance with some embodiments of the present disclosure.

To facilitate understanding, identical reference numerals have been used, where possible, to designate identical elements that are common to the figures. The figures are not drawn to scale and may be simplified for clarity. Elements and features of one embodiment nay be beneficially incorporated in other embodiments without further recitation.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure. The claims as set forth below are incorporated into and constitute part of this Detailed Description.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

"Radial position" and/or "radial distance," when used in reference to the radial coordinate "r" refers to radial position relative to the centerline (r=0) of the central core portion in the optical fiber.

The length dimension "micrometer" may be referred to herein as micron (or microns) or µm.

The "refractive index profile" is the relationship between refractive index or relative refractive index and radial distance r from the core portion's centerline. For relative refractive index profiles depicted herein as relatively sharp boundaries between various regions, normal variations in processing conditions may result in step boundaries at the interface of adjacent regions that are not sharp. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the inner and/or common cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

Unless stated otherwise, the "relative refractive index percent" is defined as $\Delta\% = 100 \times (n_i^2 - n_c^2)/2n_i^2$, and as used herein $n_c$ is the average refractive index of undoped silica glass. As used herein, the relative refractive index is represented by $\Delta$ and its values are given in units of "%", unless otherwise specified. The terms: relative refractive index percent, relative refractive index, refractive index delta, refractive index, relative refractive index delta, delta, $\Delta$, $\Delta\%$, % $\Delta$, delta %, % delta and percent delta may be used interchangeably herein. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, and/or Br. Examples of downdopants include fluorine and $B_2O_3$. As described herein, while the relative refractive index of the optical profiles are calculated where index of $n_c$ is undoped silica, the entire index profile of the optical fiber can be shifted linearly up (or down) in order to obtain equivalent optical fiber properties.

The "effective area" can be defined as:

$$A_{\mathit{eff}} = \frac{2\pi \left[ \int_0^\infty f(r)^2 r\, dr \right]^2}{\int_0^\infty (f(r))^4 r\, dr}$$

where f(r) is the transverse component of the electric field of the guided optical signal and r is radial position in the fiber. "Effective area" or "$A_{\mathit{eff}}$" depends on the wavelength of the optical signal. Specific indication of the wavelength will be made when referring to "Effective area" or "$A_{eff}$" herein. Effective area is expressed herein in units of "$\mu m^2$", "square micrometers", "square microns" or the like.

"Chromatic dispersion," herein referred to as "dispersion" unless otherwise noted, of an optical fiber is the sum of the material dispersion, the waveguide dispersion, and the inter-modal dispersion. "Material dispersion" refers to the manner in which the refractive index of the material used for the optical core affects the velocity at which different optical wavelengths propagate within the core. "Waveguide dispersion" refers to dispersion caused by the different refractive indices of the core and cladding of the optical fiber. In the case of single mode waveguide fibers, the inter-modal dispersion is zero. Dispersion values in a two-mode regime assume intermodal dispersion is zero. The zero dispersion wavelength ($\lambda_0$) is the wavelength at which the dispersion has a value of zero. Dispersion slope is the rate of change of dispersion with respect to wavelength. Dispersion and dispersion slope are reported herein at a wavelength of 1310 nm or 1550 nm, as noted, and are expressed in units of ps/nm/km and ps/nm²/km, respectively. Chromatic dispersion is measured as specified by the IEC 60793-1-42:2013 standard, "Optical fibres—Part 1-42: Measurement methods and test procedures—Chromatic dispersion."

The cutoff wavelength of an optical fiber is the minimum wavelength at which the optical fiber will support only one propagating mode. For wavelengths below the cutoff wavelength, multimode transmission may occur and an additional source of dispersion may arise to limit the fiber's information carrying capacity. Cutoff wavelength will be reported herein as a cable cutoff wavelength. The cable cutoff wavelength is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

The term "attenuation," as used herein, is the loss of optical power as the signal travels along the optical fiber. Attenuation is measured as specified by the IEC 60793-1-40:2019 standard entitled "Optical fibers—Part 1-40: Attenuation measurement methods."

The mode field diameter (MFD) is measured using the Petermann II method and was determined from:

$$MFD = 2w$$

$$w = \frac{\int_0^\infty (f(r))^2}{\int_0^\infty \left(\frac{df(r)}{dr}\right)^2 r \, dr}$$

where f(r) is the transverse component of the electric field distribution of the guided light and r is the radial position in the fiber. Unless otherwise specified, "mode field diameter" or "MFD" refers to the mode field diameter at 1310 nm.

Figure 1B:
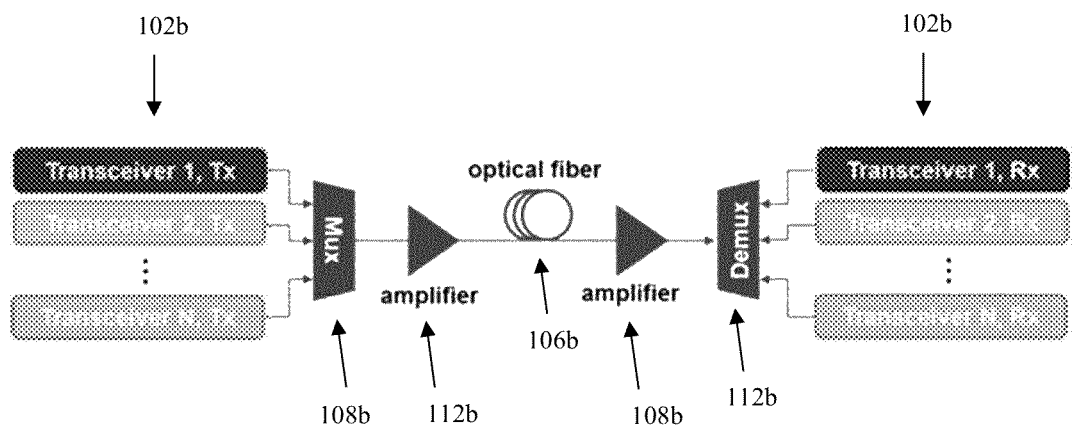
Figure 1C:
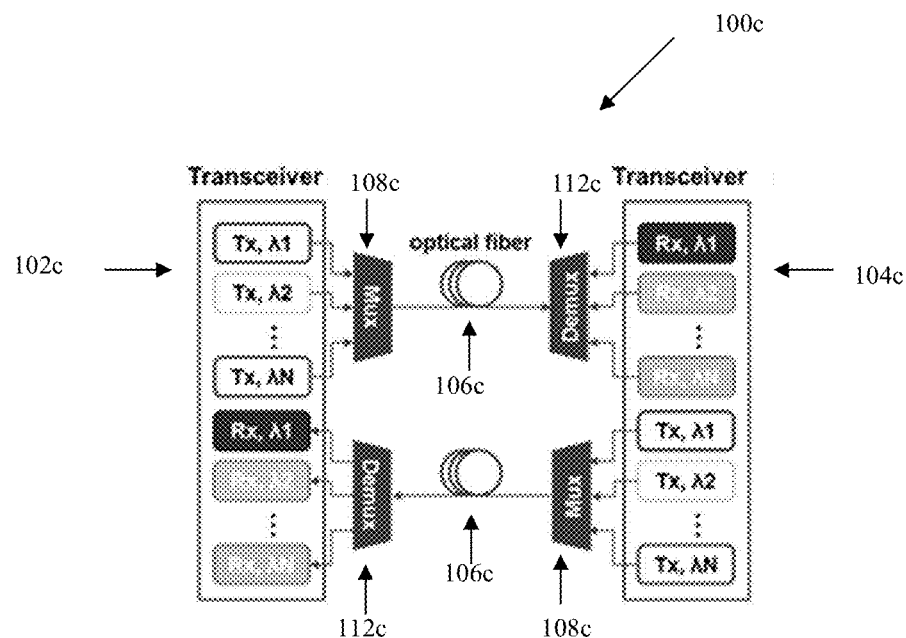
Figure 1D:
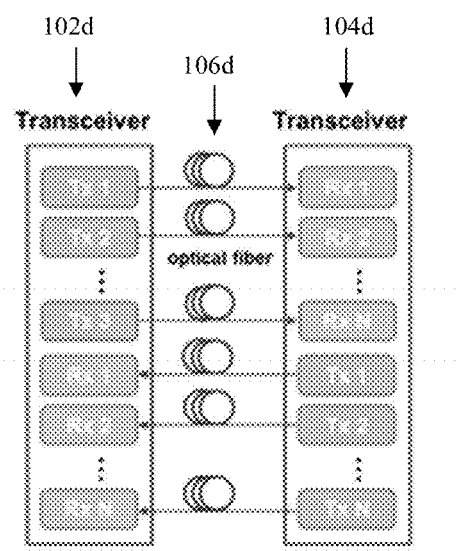

FIG. 1A depicts a simplified schematic diagram of an exemplary optical fiber data communications system ("system") 100a that comprises a transmitter 102a and a receiver 104a optically connected by a low loss dispersion limiting optical fiber 106a. FIG. 1B depicts an exemplary diagram of an optical communication system 100b for inter-data center applications using dense wavelength-division multiplexing (DWDM). The optical communication system 100b comprises a first set of transceivers 102b and a second set of transceivers 104b optically connected by a low loss dispersion limiting optical fiber 106b. The use of "$R_X$" and "$T_X$" nomenclature (with regards to FIGS. 1B-1D) generally refer to aspects of communications for a given channel. That is, $R_X$ refers to receiving a signal, while $T_X$ refers to transmitting a signal. The optical communication system 100b further comprises a multiplexer 108b optically coupled to the first set of transceivers 102b and a demultiplexer 110b optically coupled to the second set of transceivers 104b. The multiplexer 108b and demultiplexer 110b are each optically coupled to an amplifier 112b. FIG. 1C depicts an exemplary diagram of an optical communication system 100c for intra-data center applications using wavelength-division multiplexing (WDM). The optical communication system 100c comprises a first transceiver 102c operating at multiple wavelengths (k) and a second transceiver 104c operating at multiple wavelengths optically connected by a low loss dispersion limiting optical fiber 106c. The optical communication system 100c further comprises a multiplexer 108c and demultiplexers 112c optically coupled to each transceiver 102c, 104c and a demultiplexers 112c optically coupled to each transceiver 102c, 104c. FIG. 1D depicts an exemplary diagram of an optical communication system 100d for intra-data center applications using parallel optical fiber links. The optical communication system 100d comprises a first transceiver 102d operating at multiple wavelengths and a second transceiver 104d operating at multiple wavelengths optically connected by multiple low loss dispersion limiting optical fibers 106d.

Returning to FIG. 1A, Transmitter 102 includes a light source that generates an optical signal. The optical signal is light that embodies, encodes or otherwise represents information or data. Light sources include lasers and diodes. Representative light sources include silicon photonics lasers and VCSELs (vertical cavity surface emitting lasers). The optical signal from these light sources is modulated at a line rate of 10 Gb/s or higher, for example 25 Gb/s, 28 Gb/s, 50 Gb/s or 56 Gb/s. In one embodiment, transmitter 102 is implemented as a chip, such as a silicon chip compatible with the silicon photonics technology platform. Transmitter 102 may also include devices for receiving electrical signals and configuring the light source to produce optical signal(s) corresponding to electrical signal(s).

Receiver 104 receives the optical signal from optical fiber 106. Receiver 104 includes a detector, such as a photodetector, that provides an output characteristic of the optical signal. The detector is responsive to the wavelength(s) of the optical signal. The detector may convert the optical signal to an electrical signal having a current or voltage proportional to or otherwise characteristic of the optical signal. In one embodiment, receiver 104 is implemented as a chip, such as a silicon chip compatible with the silicon photonics technology platform. The receiver 104 may receive the signal directly from optical fiber 106 or indirectly from optical fiber 106 via a waveguide (e.g. an on-chip waveguide).

The optical fiber 106 is interconnected with transmitter 102 and receives the optical signal produced by the light source. The optical fiber 106 delivers the optical signal to receiver 104. The optical fiber 106 may be a single mode fiber or a multimode fiber. In one embodiment, the optical fiber 106 is a silica-based fiber that includes a higher index silica-based core and a lower index silica-based cladding.

Figure 2A:
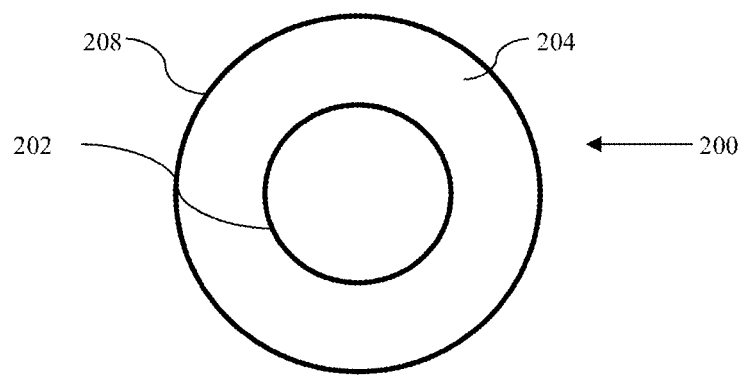
FIG. 2A depicts an optical fiber in accordance with some embodiments of the present disclosure.
Figure 2B:
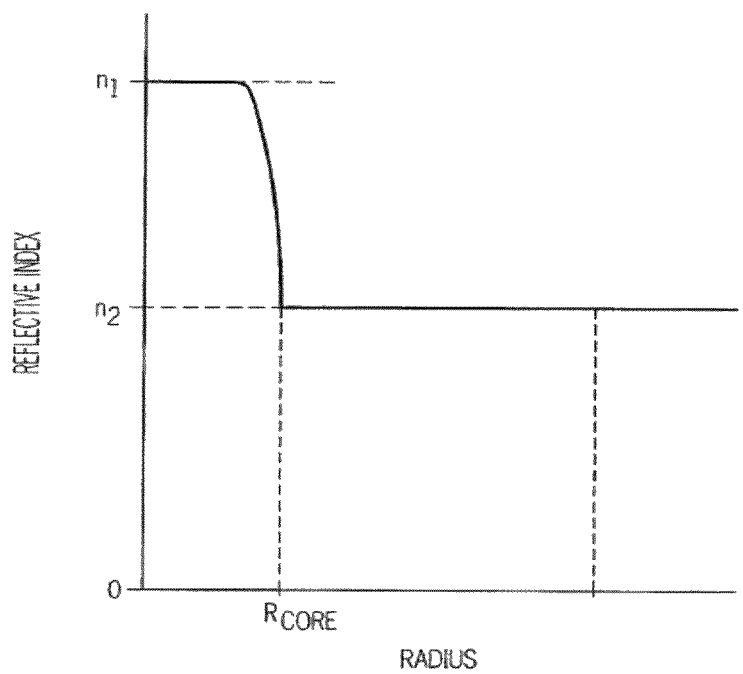
FIG. 2B depicts a graph of refractive index as a function of radius of the optical fiber of FIG. 2A in accordance with some embodiments of the present disclosure.
Figure 3A:
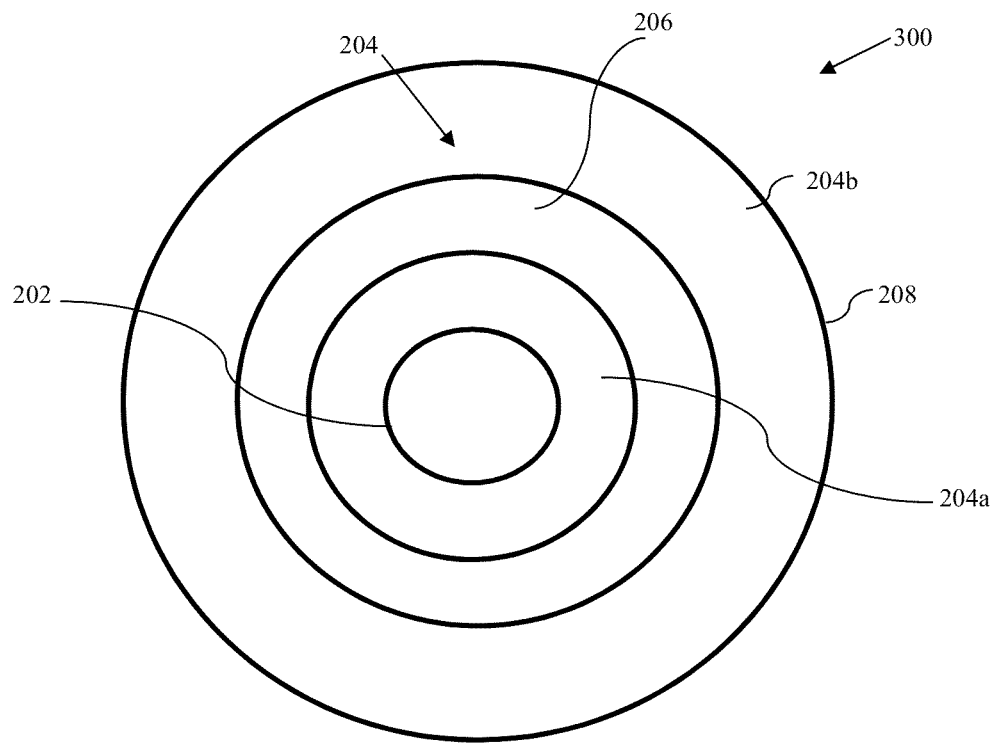
FIG. 3A depicts an optical fiber in accordance with some embodiments of the present disclosure.
Figure 3B:
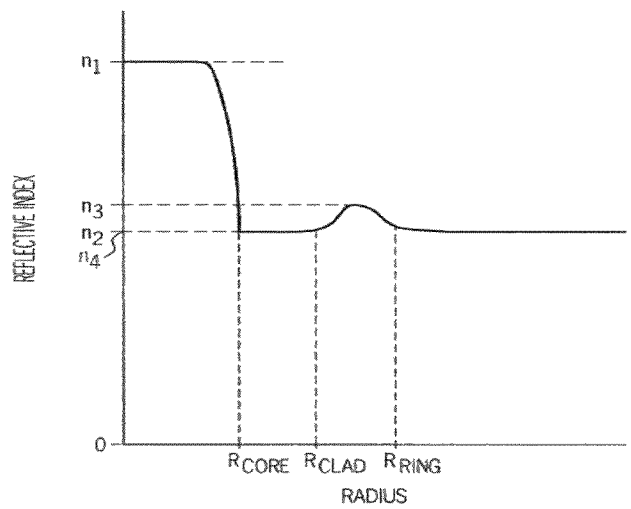
FIG. 3B depicts a graph of refractive index as a function of radius of the optical fiber of FIG. 3A in accordance with some embodiments of the present disclosure.

A schematic cross-sectional depiction of an optical fiber used in the exemplary optical fiber data communications system ("system") 100a, 100b, 100c is further described below and shown in FIG. 2A and FIG. 3A. FIG. 2A depicts an optical fiber 200 comprising a core 202 and a cladding 204 surrounding the core 202. FIG. 3A depicts an optical fiber 300 that also comprises the core 202 and the cladding 204 surrounding the core 202 and further comprises a cladding ring 206 disposed within the cladding 204, separating the cladding 204 into a first cladding portion 204a, positioned between the cladding ring 206 and the core 202 and a second cladding portion 204b. The term "ring" as used herein, refers to a cladding region that has a variable refractive index with a maximum refractive index that is higher than that of the adjacent cladding regions that are in contact therewith. FIGS. 2B and 3B each depict a graph of refractive index as a function of radius of the optical fiber 200, 300 of FIGS. 2A and 3A, respectively.

Referring again to FIG. 2A and FIG. 3A, the fiber core 202 may comprise silica glass, polymer or the like and may be doped with K, Cl, F, or a combination thereof. While not intending to be limited by theory, doping the core 202 may reduce the viscosity and the fictive temperature of the core 202. The fiber cladding 204 includes an outer cladding surface 208 and may comprise pure silica, F-doped silica, F(fluorine)/B(boron) co-doped silica, low index polymer, or the like. Doping the cladding 204 with F may lower the refractive index of the cladding 204. Further, the cladding 204 comprises a lower refractive index than the core 202.

In the embodiments depicted in FIGS. 2A and 3A, the optical fiber 200, 300 comprise a single core 202, however, in other embodiments, the fibers 200, 300 may comprise multiple cores. In embodiments comprising multiple cores, the multiple cores may be spun and the optical fiber 200, 300 may comprise any spin configuration, such as a unidirectional spin configuration, a bidirectional spin configuration, or the like. Further, in some embodiments, the optical fiber 200, 300 may comprise a step index profile, a parabolic index profile, a graded index profile, a triangular index profile, or the like.

Referring again to FIGS. 2A and 2B, the core 202 of the optical fiber 200 may comprise a radius $R_{CORE}$ of from about 1.5 μm to about 5 μm, for example, 2 μm to about 4 μm, 2.2 μm to about 3 μm, or the like. For example, 2.23 μm, 2.28 μm, 2.3 μm, 2.35 μm, 2.4 μm, 2.45 μm, 2.5 μm, 2.55 μm, 2.58 μm, 2.6 μm, 2.65 μm, 2.7 μm, 2.75 μm, 2.8 μm, 2.85 μm, 2.9 μm, 2.95 μm, or the like. The core 202 of optical fiber 200 comprises a refractive index $n_1$ and a relative refractive index $\Delta_1$ (which is relative to a refractive index $n_s$ of pure silica and denotes the refractive index change between pure silica and the core 202). The relative refractive index $\Delta_1$ comprises $(n_1-n_s)/n_s$. As stated above, the core 202 may be pure silica glass or glass doped with Cl, or K, or F for low loss. As non-limiting examples, the relative refractive index $\Delta_1$ may be from about −0.1 to about 0.2, or the like, for example, −0.1, −0.05, 0, 0.05, 0.1, 0.15, or the like. The cladding 204 comprises a refractive index $n_2$ and a relative refractive index $\Delta_2$ (which is relative to the refractive index $n_s$ of pure silica and denotes the refractive index change between pure silica and the core 202). The relative refractive index $\Delta_2$ comprises $(n_2-n_s)/n_s$. Further, $n_2<n_1$ and $\Delta_2<\Delta_1$. As non-limiting examples, the relative refractive index $\Delta_2$ may be from about −0.4 to about −0.7, or the like, for example, −0.45, −0.5, −0.55, −0.6 −0.65, or the like.

Further, the low loss dispersion limiting optical fiber 200 comprises a relative refractive index change Δ between the core 202 and the cladding 204 of from about 0.3 to about 0.8, where $\Delta=\Delta_1-\Delta_2$. As non-limiting examples, the refractive index change Δ may be from about 0.4 to about 0.7, 0.5 to about 0.65, or the like, for example, 0.35, 0.4, 0.45, 0.5, 0.55, 0.6, 0.65, 0.7, 0.75, or the like. Further, including a dopant in the core 202, the cladding 204, or both, (e.g., an updopant or a downdopant) may alter the relative refractive index between the core 202 and the cladding 204, i.e. alter the refractive index change Δ. As used herein, an "updopant" is a dopant which has a propensity to raise the refractive index relative to pure undoped $SiO_2$ and a "downdopant" is a dopant which has a propensity to lower the refractive index relative to pure undoped $SiO_2$.

Referring still to FIGS. 2A and 2B, the optical fiber 200 may comprise a cutoff wavelength of about 1200 nm or less, for example, 1151 nm, 1100 nm, 1050 nm, 1031 nm, 1025 nm, 1000 nm, 975 nm, 973 nm, 950 nm, 929 nm, 925 nm, 915 nm, 911 nm, 909 nm, 905 nm, 900 nm, 875 nm, 850 nm, 825 nm, 800 nm, or the like. While not intending to be limited by theory, the cutoff wavelength is a wavelength above which guided higher order modes are no longer supported within the core 202 and the core 204 becomes a single mode core supporting only the fundamental mode. In operation, when one or more photons comprising a wavelength of about 1550 nm propagate along the optical fiber 200, the optical fiber 200 induces a mode field diameter MFD of from about 6.5 μm to about 10 μm, for example, about 7 μm to about 9.5 μm, 7.5 μm to about 9.0 μm, 7 μm to about 8.5 μm, or the like, such as 6 μm, 6.5 μm, 7 μm, 7.5 μm, 8 μm, 8.5 μm, 9 μm, 9.5 μm, 10 μm, or the like. While not intending to be limited by theory, the mode field diameter MFD is the transverse extent of the optical intensity distribution of the fundamental mode of the core 202 of the optical fiber 200.

Further, when one or more photons comprising a wavelength of about 1550 nm propagate along the optical fiber 200, the optical fiber 200 induces an effective area of from about 30 μm² to about 70 μm², for example, about 35 μm² to about 60 μm², about 40 μm² to about 55 μm², from about 45 μm² to about 50 μm², or the like, such as 30 μm², 35 μm², 40 μm², 45 μm², 50 μm², 55 μm², 60 μm², 65 μm², 70 μm², 75 μm², 80 μm², or the like. While not intending to be limited by theory, the effective area is the cross-sectional area over which the energy of the electric field of the fundamental mode of light propagating along the optical fiber 200 is distributed within the core 202. For example, the effective area of a single mode optical fiber is related to the maximum energy the core 202 can carry without inducing non-linear type signal penalties.

Referring still to FIGS. 2A and 2B, when one or more photons comprising a wavelength of about 1550 nm propagate along the optical fiber 200, the optical fiber 200 limits dispersion of the one or more photons of an absolute dispersion rate of not greater than 9 ps/nm/km, for example about 8.6 ps/nm/km or less, 8.5 ps/nm/km or less, 8 ps/nm/km or less, 7.5 ps/nm/km or less, 7 ps/nm/km or less, 6.5 ps/nm/km or less, 6 ps/nm/km or less, 5.7 ps/nm/km or less, 5.5 ps/nm/km or less, 5 ps/nm/km or less, 4.5 ps/nm/km or less, 4.5 ps/nm/km or less, 4 ps/nm/km or less, 3.6 ps/nm/km or less, 3.5 ps/nm/km or less, 3 ps/nm/km or less, 2.5 ps/nm/km or less, 2 ps/nm/km or less, 1.5 ps/nm/km or less, 1.1 ps/nm/km or less, 1 ps/nm/km or less, 0.5 ps/nm/km or less, 0.1 ps/nm/km or less, or the like.

Further, when one or more photons comprising a wavelength of about 1550 nm propagate along the optical fiber 200, the optical fiber 200 induces a dispersion slope of from about 0.05 ps/nm²/km to about 0.055 ps/nm²/km, for example, about 0.051 ps/nm²/km to about 0.054 ps/nm²/km, such as about 0.0515 ps/nm²/km, 0.0516 ps/nm²/km, 0.0518 ps/nm²/km, 0.052 ps/nm²/km, 0.0521 ps/nm²/km, 0.0525 ps/nm²/km, 0.053 ps/nm²/km, 0.0535 ps/nm²/km, 0.0538 ps/nm²/km or the like. While not intending to be limited by theory, the dispersion slope is the rate at which the absolute dispersion rate changes with wavelength. Smaller dispersion slope may be desired for flat dispersion over a wide wavelength window. Moreover, when one or more photons comprising a wavelength of about 1550 nm propagate along the optical fiber 200, optical fiber 200 induces an attenuation rate of about 0.175 dB/km or less, for example, about 0.17 dB/km or less about 0.165 dB/km or less, such as about 0.16 dB/km, 0.155 dB/km, 0.15 dB/km, 0.14 dB/km, 0.13 dB/km, 0.12 dB/km, or the like. While not intending to be limited by theory, the attenuation rate is rate of intensity loss (e.g., photon loss) of a plurality of photons propagating along the optical fiber 200.

Table 1 below lists attributes of examples of the optical fiber 200 of FIGS. 2A and 2B.

206 and the second cladding portion 204b of from about 7 μm to about 13 μm, for example, 8 μm to about 12 μm, and about 9 μm to about 11.5 μm, or the like, such as, 7 μm, 7.5 μm, 8 μm, 8.5 μm, 9 μm, 9.5 μm, 10 μm, 10.5 μm, 11 μm, 11.4 μm, 11.5 μm, 12 μm, 12.5 μm, 13 μm, or the like.

Referring still to FIGS. 3A and 3B, the core 202 of the optical fiber 300 comprises a refractive index $n_1$ and a relative refractive index $\Delta_1$ (which is relative to the refractive index $n_s$ of pure silica and denotes the refractive index change between pure silica and the core 202). The relative refractive index $\Delta_1$ comprises $(n_1-n_s)/n_s$. The first cladding portion 204a comprises a refractive index $n_2$ and a relative

TABLE 1

|  | Ex. 1 of optical fiber 200 | Ex. 2 of optical fiber 200 | Ex. 3 of optical fiber 200 | Ex. 4 of optical fiber 200 | Ex. 5 of optical fiber 200 | Ex. 6 of optical fiber 200 |
| --- | --- | --- | --- | --- | --- | --- |
| Core Material | Pure Silica | Pure Silica | Pure Silica | Pure Silica | Chlorine Doped Silica | Chlorine Doped Silica |
| Relative Refractive Index $\Delta_1$ | 0 | 0 | 0 | 0 | 0.1 | 0.15 |
| Relative Refractive Index $\Delta_2$ | −0.5 | −0.55 | −0.6 | −0.65 | −0.5 | −0.5 |
| Index Profile | Step | Step | Step | Step | Step | Step |
| Core Radius $R_{CORE}$ (μm) | 2.9 | 2.58 | 2.5 | 2.28 | 2.35 | 2.23 |
| Cutoff Wavelength (nm) | 1031 | 948 | 972 | 929 | 911 | 909 |
| Mode Field Diameter at 1550 nm (μm) | 8.5 | 8.3 | 7.8 | 7.6 | 8.0 | 7.6 |
| Effective Area at 1550 nm (μm$^2$) | 53.8 | 51.1 | 45.4 | 42.8 | 47 | 43.4 |
| Absolute Dispersion Rate (ps/nm/km) at 1550 nm | 8.6 | 5.7 | 3.6 | 0.1 | 1.1 | −0.8 |
| Dispersion Slope (ps/nm$^2$/km) at 1550 nm | 0.053 | 0.0518 | 0.0516 | 0.0521 | 0.0538 | 0.0530 |
| Attenuation Rate at 1550 nm (dB/km) | 0.17 or less | 0.17 or less | 0.17 or less | 0.17 or less | 0.17 or less | 0.17 or less |

Referring now to FIGS. 3A and 3B, the optical fiber 300 comprising the cladding ring 206 disposed within the cladding 204, between the first cladding portion 204a and the second cladding portion 204b, is schematically depicted (FIG. 3A) and graphically depicted (FIG. 3B). The core 202 of the optical fiber 300 may comprise a radius $R_{CORE}$ of from about 1.5 μm to about 5 μm, for example, 2 μm to about 4 μm, 2.2 μm to about 3 μm, 2.2 μm to about 2.8 μm, or the like, for example, 2.23 μm, 2.28 μm, 2.3 μm, 2.35 μm, 2.4 μm, 2.45 μm, 2.5 μm, 2.55 μm, 2.58 μm, 2.6 μm, 2.65 μm, 2.7 μm, 2.75 μm, 2.8 μm, 2.85 μm, 2.9 μm, 2.95 μm, or the like. The first cladding portion 204a of the optical fiber 300 comprises a radius $R_{CLAD}$ measured from an interface of the first cladding portion 204a and the cladding ring 206 of from about 3 μm to about 12 μm, for example about 4 μm to about 10 μm, 4.5 μm to 8.8 μm, or the like, such as 3 μm, 4 μm, 4.5 μm, 5 μm, 6 μm, 7 μm, 8 μm, 8.8 μm, 9 μm, 10 μm, 11 μm, 12 μm, or the like. Referring still to FIGS. 3A and 3B, the cladding ring 206 of the optical fiber 300 comprises a radius $R_{RING}$ measured from an interface of the cladding ring refractive index $\Delta_2$ (which is relative to the refractive index $n_s$ of pure silica and denotes the refractive index change between pure silica and the first cladding portion 204a). The relative refractive index $\Delta_2$ comprises $(n_2-n_s)/n_s$. The cladding ring 206 comprises a refractive index $n_3$ and a relative refractive index $\Delta_3$ (which is relative to the refractive index $n_s$ of pure silica and denotes the refractive index change between pure silica and the cladding ring 206). The relative refractive index $\Delta_3$ comprises $(n_3-n_s)/n_s$. The second cladding portion 204b comprises a refractive index $n_4$ and a relative refractive index $\Delta_4$ (which is relative to the refractive index $n_s$ of pure silica and denotes the refractive index change between pure silica and the second cladding portion 204b). The relative refractive index $\Delta_4$ comprises $(n_4-n_s)/n_s$.

Further, $n_1 > n_3 > n_4 > n_2$ and $\Delta_1 > \Delta_3 > \Delta_4 > \Delta_2$. As stated above, the core 202 may be pure silica glass or glass doped with Cl, or K, or F for low loss. As non-limiting examples, the relative refractive index $\Delta_1$ may be from about −0.1 to about 0.2, for example, −0.1, −0.05, 0, 0.05, 0.1, 0.15, or the like. The first cladding portion 204a, the cladding ring 206 and the second cladding portion 204b may each comprise glass (e.g., silica glass) doped with F for lowering their respective refractive indices. As non-limiting examples, the relative refractive index $\Delta_2$ may be from about −0.2 to about −0.7, or the like, for example, −0.25, 0.3, 0.35, −0.45, −0.5, −0.55, −0.6, −0.65, or the like. As non-limiting examples, the relative refractive index $\Delta_3$ may be from about −0.1 to about −0.5, or the like, for example, −0.15, −0.2, −0.25, −0.3, −0.35, −0.4, −0.45, or the like. As non-limiting examples, the relative refractive index $\Delta_4$ may be from about −0.2 to about −0.6, or the like, for example, −0.25, 0.3, 0.35, −0.45, −0.5, −0.55, −0.6, or the like.

The optical fiber 300 comprises a refractive index change $\Delta'$ between the core 202 and the first cladding portion 204a of from about 0.2 to about 0.6, where $\Delta'=\Delta_1-\Delta_2$. In some embodiments, the refractive index change $\Delta'$ may be from about 0.4 to about 0.5, for example, 0.25, 0.3, 0.35, 0.4, 0.41, 0.43, 0.45, 0.47, 0.49, 5, 5.5, or the like. The optical fiber 300 also comprises a refractive index change $\Delta''$ between the first cladding portion 204a and the cladding ring 206 of from about 0 and about 0.2 (i.e. the refractive index of the cladding ring 206 may be higher than the refractive index of the first cladding portion 204a), where $\Delta''=\Delta_3-\Delta_2$. In some embodiments, the refractive index change $\Delta''$ may be about 0.02, 0.05, 0.1, 0.12, 0.15, 0.18, or the like. Moreover, the optical fiber 300 comprises a refractive index change $\Delta'''$ between the first cladding portion 204a and the second cladding portion 204b of from about 0 to about 0.1 (i.e. the refractive index of the second cladding portion 204b may be higher than the refractive index of the first cladding portion 204a), where $\Delta'''=\Delta_4-\Delta_2$. In some embodiments, the refractive index change $\Delta'''$ may be about −0.02, −0.04, −0.05, −0.1, or the like.

The optical fiber 300 may comprise a cutoff wavelength of about 1600 nm or less, 1500 nm or less, 1350 nm or less, or the like, for example, 1550 nm, 1516 nm, 1500 nm, 1464 nm, 1450 nm, 1403 nm, 1400 nm, 1384 nm, 1350 nm, 1300 nm, 1250 nm, 1200 nm, 11150 nm, 1100 nm, 1050 nm, 1000 nm, 950 nm, 900 nm, 850 nm, 800 nm, or the like. Further, when one or more photons comprising a wavelength of about 1550 nm propagate along the optical fiber 300, the optical fiber 300 induces a mode field diameter of a photon comprising a wavelength of about 1550 nm of from about 8 µm to about 12 µm, for example, about 9 µm to about 11 µm, 9.5 µm to about 10.5 µm, or the like, such as 8 µm, 8.5 µm, 9 µm, 9.5 µm, 9.9 µm, 10 µm, 10.1 µm, 10.2 µm, 10.5 µm, 11 µm, 11.5 µm, 12 µm, or the like.

Further, in some embodiments, when one or more photons comprising a wavelength of about 1550 nm propagate along the optical fiber 300, the optical fiber 300 induces an effective area of from about 50 µm² to about 100 µm², 60 µm² to about 90 µm², 70 µm² to about 80 µm², or the like, such as 50 µm², 55 µm², 60 µm², 65 µm², 70 µm², 73.5 µm², 74.3 µm², 75 µm², 76.8 µm², 78.7 µm², 80 µm², 85 µm², 90 µm², 95 µm², 100 µm², or the like. Further, when one or more photons comprising a wavelength of about 1550 nm propagate along the optical fiber 300, the optical fiber 300 induces dispersion at an absolute dispersion rate of about 9 ps/nm/km or less, for example about 8.6 ps/nm/km or less, 8.5 ps/nm/km or less, 8 ps/nm/km or less, 7.5 ps/nm/km or less, 7 ps/nm/km or less, 6.5 ps/nm/km or less, 6 ps/nm/km or less, 5.7 ps/nm/km or less, 5.5 ps/nm/km or less, 5 ps/nm/km or less, 4.5 ps/nm/km or less, 4.5 ps/nm/km or less, 4 ps/nm/km or less, 3.8 ps/nm/km or less, 3.6 ps/nm/km or less, 3.5 ps/nm/km or less, 3 ps/nm/km or less, 2.5 ps/nm/km or less, 2 ps/nm/km or less, 1.5 ps/nm/km or less, 1.1 ps/nm/km or less, 1 ps/nm/km or less, 0.5 ps/nm/km or less, 0.1 ps/nm/km or less, or the like.

In some embodiments, when one or more photons comprising a wavelength of about 1550 nm propagate along the optical fiber 300, the optical fiber 300 induces dispersion at a dispersion slope of from about 0.05 ps/(nm²)km to about 0.1 ps/(nm²)km, 0.055 ps/(nm²)km to about 0.085 ps/(nm²)km, or the like, such as about 0.0525 ps/(nm²)km, 0.055 ps/(nm²)km, 0.0564 ps/(nm²)km, 0.0575 ps/(nm²)km, 0.06 ps/(nm²)km, 0.0625 ps/(nm²)km, 0.0645 ps/(nm²)km, 0.065 ps/(nm²)km, 0.0675 ps/(nm²)km, 0.0676 ps/(nm²)km, 0.07 ps/(nm²)km, 0.0725 ps/(nm²)km, 0.075 ps/(nm²)km, 0.0775 ps/(nm²)km, 0.08 ps/(nm²)km, 0.0825 ps/(nm²)km, 0.0834 ps/(nm²)km, 0.085 ps/(nm²)km, or the like.

Moreover, when one or more photons comprising a wavelength of about 1550 nm propagate along the optical fiber 300, the optical fiber 300 induces attenuation at an attenuation rate of about 0.175 dB/km or less, for example, 0.17 dB/km or less, about 0.165 dB/km or less, such as about 0.16 dB/km, 0.155 dB/km, 0.15 dB/km, 0.14 dB/km, 0.13 dB/Km, 0.12 dB/km, or the like.

Table 2, below, lists attributes of example optical fiber 300.

TABLE 2

|  | Ex. 1 of optical fiber 300 | Ex. 2 of optical fiber 300 | Ex. 3 of optical fiber 300 | Ex. 4 of optical fiber 300 |
| --- | --- | --- | --- | --- |
| Core Material | Chlorine Doped Silica | Chlorine Doped Silica | Chlorine Doped Silica | Chlorine Doped Silica |
| Relative Refractive Index $\Delta_1$ | 0.15 | 0.15 | 0.15 | 0.15 |
| Relative Refractive Index $\Delta_2$ | −0.28 | −0.28 | −0.3 | −0.34 |
| Relative Refractive Index $\Delta_3$ | −0.15 | −0.16 | −0.15 | −0.34 |
| Relative Refractive Index $\Delta_4$ | −0.28 | −0.28 | −0.3 | −0.4 |
| Index Profile | Step | Step | Step | Step |
| Core Radius $R_{CORE}$ (µm) | 2.8 | 2.8 | 2.7 | 2.2 |

TABLE 2-continued

|  | Ex. 1 of optical fiber 300 | Ex. 2 of optical fiber 300 | Ex. 3 of optical fiber 300 | Ex. 4 of optical fiber 300 |
|---|---|---|---|---|
| First Cladding Portion Radius $C_{LAD}$ (μm) | 8 | 8.8 | 4.5 | 8 |
| Cladding Ring Radius $R_{RING}$ (μm) | 11 | 11.4 | 11 | 9 |
| Cutoff Wavelength (nm) | 1516 | 1403 | 1464 | 1384 |
| Mode Field Diameter at 1550 nm (um) | 10.2 | 9.9 | 10.1 | 9.9 |
| Effective Area at 1550 nm (μm$^2$) | 78.7 | 73.5 | 76.8 | 74.3 |
| Absolute Dispersion Rate ps/(nm)km at 1550 nm | 3.8 | 4.5 | 3.8 | 3.5 |
| Dispersion Slope ps/(nm$^2$)km at 1550 nm | 0.0645 | 0.0564 | 0.0676 | 0.0834 |
| Attenuation Rate at 1550 nm (dB/km) | 0.17 or less | 0.17 or less | 0.17 or less | 0.17 or less |

Existing optical systems for data centers usually use standard single mode fiber. Typically, low fiber loss has small impact on data capacity for short reach systems (e.g. 50 km to 150 km), such as intra-data center (DC) links or data center interconnect (DCI) systems. This is true for previous generations of DCI systems where there is no flexible tuning of modulation formats and also where transmission performance (e.g. signal to noise ratio, SNR) is not dominated by optical fibers. However, for next and future generations of DCI systems, probabilistic constellation shaping (PCS) technology is very likely to be used which provides fine-granuality tuning of modulation formats, meaning that optical signal to noise ratio (OSNR) improvements due to low fiber loss will directly translate into higher data capacity. Thus, low fiber loss (e.g. attenuation rate less than 0.17 dB/km, more preferably less than 0.16 dB/km) leads to about 800 to about 3500 data capacity increase for data center links over 50 kin, as compared to systems with attenuation rate of 0.2 dB/km optical fiber. Moreover, per wavelength data capacity approaches saturation in next generation DCI systems, which leads to constraints of optical transceiver implementation penalties. Low fiber loss will increase link OSNR and relax transceiver implementation constraints.

Embodiments of the optical fiber disclosed herein having low fiber dispersion (e.g. absolute value less than 10 ps/nm/km, more preferably less than 5 ps/nm/km) reduces or removes the complexity of digital chromatic dispersion (CD) compensation. Furthermore, embodiments of the optical fiber disclosed herein provides power consumption of 0.5 W to 4.5 W depending on fiber length and dispersion coefficient, as compared to standard single mode fiber, which is a substantial improvement considering that the entire optical transceiver power consumption is around 15 W to 20 W.

Fiber dispersion slope and effective area have little impact on data capacity and CD compensation complexity. Therefore, the benefits of the proposed optical fiber disclosed herein will not be diminished even if practical fabrication leads to moderately higher dispersion slope and smaller effective area as compared with standard single mode fiber.

Figure 4:
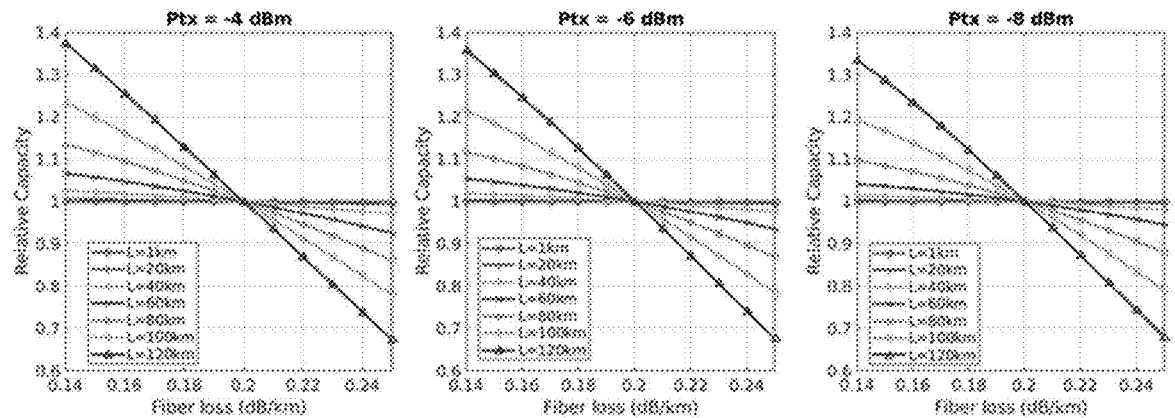
FIG. 4 depicts relative capacity vs. fiber loss for optical output power of −4 dBm, −6 dBm, and −8 dBm in accordance with some embodiments of the present disclosure.

FIG. 4 depicts relative capacity vs. fiber loss for transceiver optical output power (Ptx) of −4 dBm, −6 dBm, and −8 dBm. Fiber loss of 0.2 dB/km is used as a reference. Ptx is the output optical power of transceivers. Significant capacity gain can be obtained using low loss fiber, especially for relatively long links over 50 km. The data capacity improvement comes from the increase of link OSNR using low loss fiber. In previous and current DCI systems, higher OSNR does not necessarily result in higher data capacity, since the data rate is determined by the agreed symbol rate and discrete levels of modulation format such as QPSK and 16-QAM. However, in next and future generations of DCI systems, probabilistic constellation shaping (PCS) technology is very likely to be adopted. PCS is a technology that provides improvements in both data capacity and data rate granularity, which has already been implemented in some commercial transponders. In systems with PCS technology, OSNR improvements due to low fiber loss directly translate into data capacity enhancements.

Figure 5:
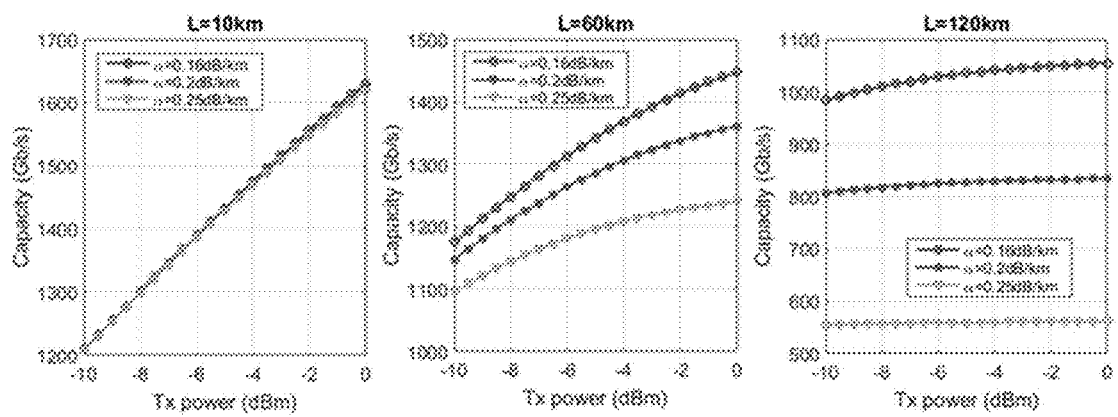
FIG. 5 depicts data capacity vs. transceiver output optical power for different link lengths in accordance with some embodiments of the present disclosure.

FIG. 5 depicts data capacity vs. transceiver output optical power for different link lengths. To achieve a same data capacity, system with 0.16 dB/km loss requires much smaller output optical power of transceivers as compared to that of 0.2 dB/km fiber loss. In long links over 100 km, it becomes impossible for 0.2 dB/km fiber system to achieve same capacity as 0.16 dB/km fiber system by increasing transceiver output optical power.

Figure 6:
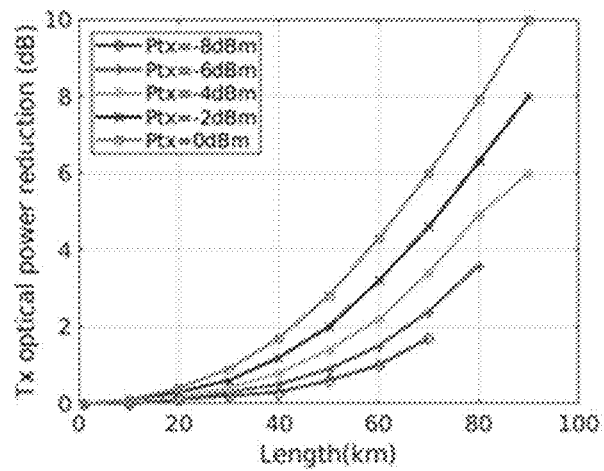
FIG. 6 depicts the reduction of the required transceiver output optical power for links using 0.16 dB/km loss fiber as compared with 0.2 dB/km loss fiber.

FIG. 6 depicts the reduction of the required transceiver output optical power for links using 0.16 dB/km loss fiber as compared with 0.2 dB/km loss fiber. Significant reduction is obtained for links over 20 km. Ptx in the legend corresponds to the $T_X$ power of 0.2 dB/km fiber system in FIG. 5.

Figure 7:
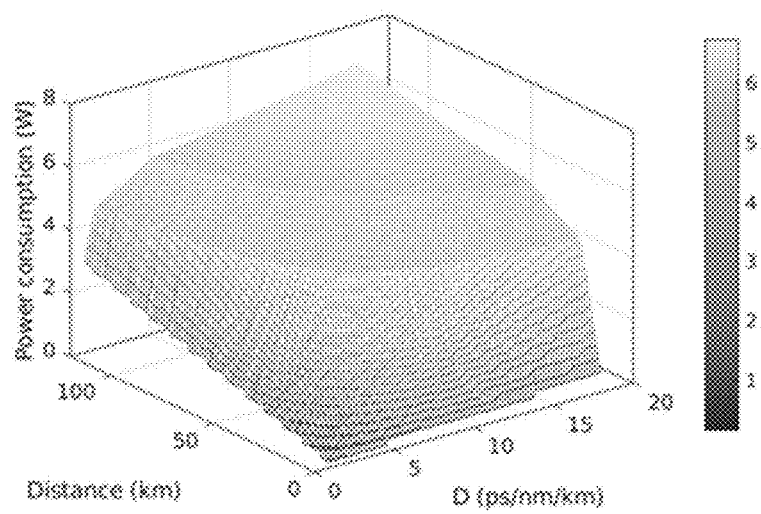
FIG. 7 depicts modeling results of digital signal processing (DSP) power consumption in chromatic dispersion (CD) compensation for different fiber length and dispersion coefficients.

FIG. 7 depicts modeling results of digital signal processing (DSP) power consumption in chromatic dispersion (CD) compensation for different fiber length and dispersion coefficients, assuming a 90 Gbaud symbol rate, a 1.5 oversampling ratio, and 7 nm CMOS technology.

Figure 8:
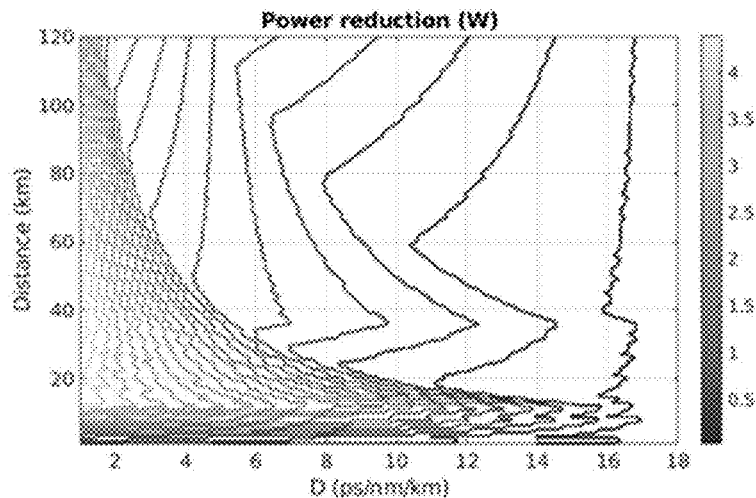
FIG. 8 depicts power savings in CD compensation using low dispersion fiber as compared with 17 ps/nm/km fiber.

FIG. 8 depicts power savings in CD compensation using low dispersion fiber as compared with 17 ps/nm/km fiber. Using low dispersion fiber as described herein, 0.5 W to 4.5 W power savings are obtained; a significant improvement given that the entire transceiver power consumption is about 15 W to 20 W.

Figure 9:
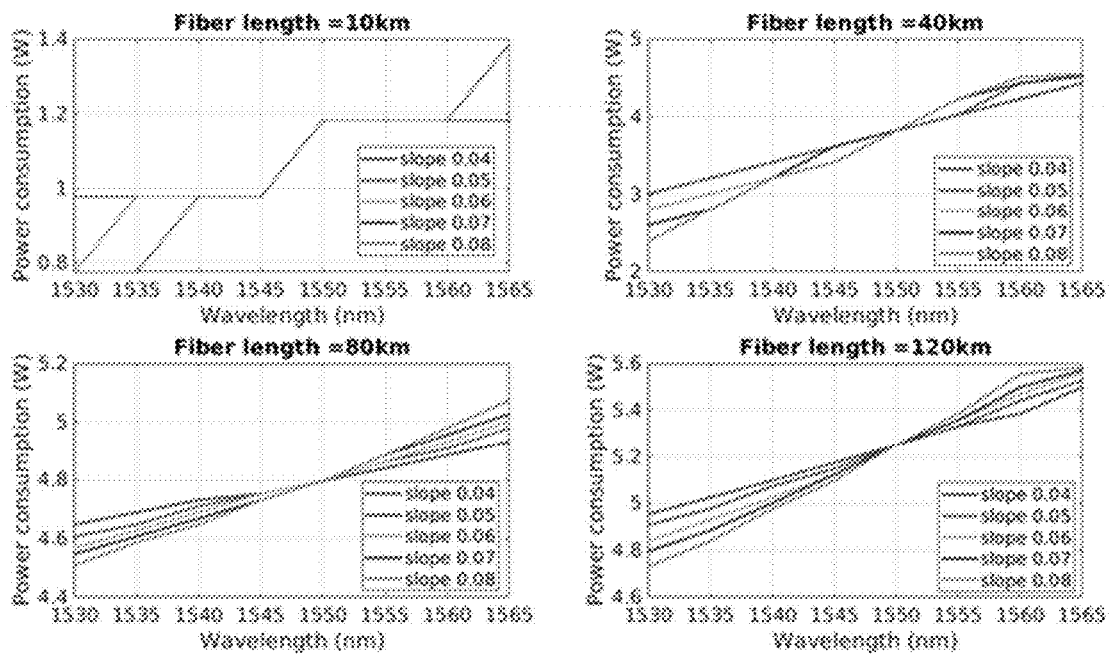
FIG. 9 depicts DSP power consumption in CD compensation for different dispersion slope.

FIG. 9 depicts DSP power consumption in CD compensation for different dispersion slope (unit, ps/nm2/km). The fiber dispersion is assumed 4.25 ps/nm/km. Generally, more power is required at long wavelengths due to higher dispersion. However, the difference between various dispersion slopes is small. Therefore, no significant power penalty will occur even if the proposed optical fiber described herein has a moderately higher dispersion slope.

Figure 10:
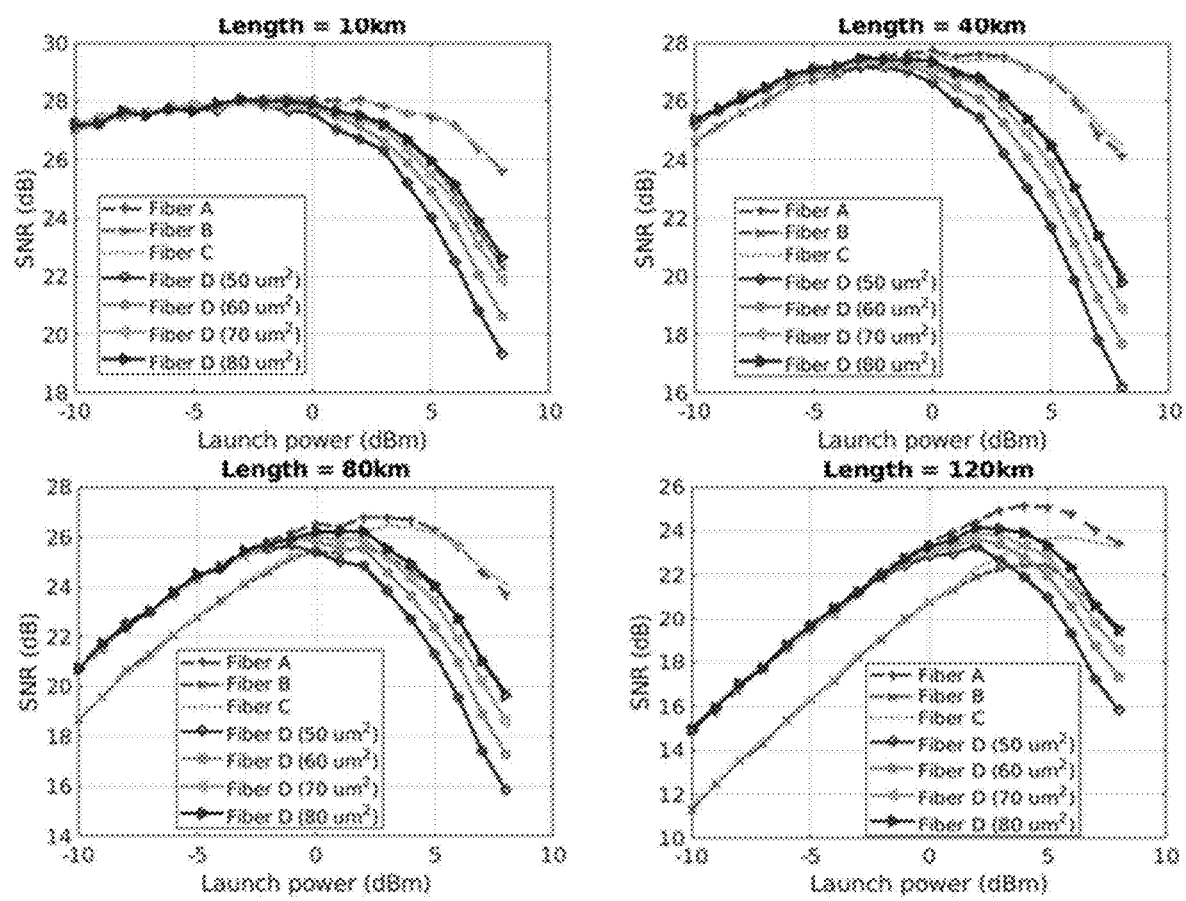
FIG. 10 depicts a Monte-Carlo simulation results comparing the transmission performance of four different types of optical fiber.

FIG. 10 depicts Monte-Carlo simulation results comparing the transmission performance of four different types of optical fiber shown in Table 3.

TABLE 3

| | Low loss | High loss |
|---|---|---|
| Low dispersion | (D) Example of proposed α = 0.16 gB/km, D = 4 ps/nm/km, Aeff = 50~80 um2 | (B) LEAF α = 0.19 dB/km, D = 4.23 ps/nm/km, Aeff = 72.4 um2 |
| High | (A) SMF-28 ULL α = 0.16 dB/km, D = 17 ps/nm/km, Aeff = 82 um2 | (C) Generic SMF α = 0.19 dB/km, D = 17 ps/nm/km, Aeff = 80 um2 |

Lower fiber loss shows SNR improvement at low launch power region. Smaller dispersion and smaller effective area result in higher nonlinear distortions, especially at high launch power regions. However, comparing the different effective areas of fiber D, very little difference in SNR is shown at low launch power region up to −2 dBm. Practical DCI systems operate at low launch power region to avoid nonlinear distortions and to reduce power consumption. Therefore, no significant SNR penalty will occur even if the proposed low loss low dispersion fiber has a smaller effective area than standard single mode fiber It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments nay occur to persons skilled in the art, the description should be construed to include everything within the scope of the appended claims and their equivalents.

The invention claimed is:

1. A data center optical communications system comprising a single-span transmission link, comprising:
   a wavelength-division multiplexing transmitter comprising a plurality of light sources, wherein each light source is configured to provide light;
   an optical fiber operably connected to said wavelength-division multiplexing transmitter and configured to receive light from the plurality of light sources, wherein the optical fiber has a length L of 50 km or greater, wherein the optical fiber has an absolute dispersion rate of less than 10 ps/nm/km and an attenuation rate of less than 0.17 dB/km and provides power consumption of 0.5 W to 4.5 W, wherein the optical fiber comprises a core and a cladding surrounding the core, wherein the core of the optical fiber comprises a relative refractive index $\Delta_1$ and wherein the cladding of the optical fiber comprises a relative refractive index $\Delta_2$, and wherein $\Delta_2 < \Delta_1$; and
   a receiver configured to receive light from the optical fiber, wherein the receiver includes a detector for detecting the light;
   wherein the wavelength-division multiplexing transmitter, the optical fiber, and the receiver are configured to transmit light unidirectionally from the wavelength-division multiplexing transmitter to the receiver via the optical fiber;
   wherein the system comprises a single-span transmission link.

2. The system of claim 1, wherein the core comprises silica glass, and wherein the silica glass of the core is doped with K, Cl, F, or a combination thereof.

3. The system of claim 1, wherein the optical fiber comprises a step index profile or a parabolic index profile.

4. The system of claim 1, wherein the core comprises a radius of from about 2.2 μm to about 3 μm.

5. The system of claim 1, wherein the core of the optical fiber comprises a relative refractive index $\Delta_1$ of from about −0.1 to about 0.2, where:
   $\Delta_1$ comprises $(n_1 - n_s)/n_s$;
   $n_1$ comprises a refractive index of the core; and
   $n_s$ comprises a refractive index of pure silica.

6. The system of claim 1, wherein the cladding of the optical fiber comprises a relative refractive index $\Delta_2$ of from about −0.4 to about −0.7, where:
   $\Delta_2$ comprises $(n_2 - n_s)/n_s$;
   $n_2$ comprises a refractive index of the cladding; and
   $n_s$ comprises a refractive index of pure silica.

7. The system of claim 1, wherein the optical fiber comprises a cutoff wavelength of about 1200 nm or less.

8. The system of claim 1, wherein the optical fiber comprises a mode field diameter of from about 7.5 μm to about 9.0 μm.

9. The system of claim 1, wherein the optical fiber comprises an effective area of from about 40 μm$^2$ to about 55 μm$^2$.

10. The system of claim 1, wherein the optical fiber comprises a dispersion slope of from about 0.051 ps/(nm$^2$) km to about 0.054 ps/(nm$^2$)km.

11. The system of claim 1, wherein the wavelength-division multiplexing transmitter is a first wavelength-division multiplexing transmitter, the optical fiber is a first optical fiber, the receiver is a first receiver, and the first wavelength-division multiplexing transmitter, the first optical fiber, and the first receiver are configured to transmit light unidirectionally from the first wavelength-division multiplexing transmitter to the first receiver via the first optical fiber in a first direction, the system further comprising:
   a second wavelength-division multiplexing transmitter comprising a plurality of light sources, wherein each light source is configured to provide light;
   a second optical fiber operably connected to said second wavelength-division multiplexing transmitter and configured to receive light from the plurality of light sources; and
   a second receiver configured to receive light from the second optical fiber, wherein the second receiver includes a detector for detecting the light;
   wherein the second wavelength-division multiplexing transmitter, the second optical fiber, and the second receiver are configured to transmit light unidirectionally from the second wavelength-division multiplexing transmitter to the second receiver via the second optical fiber in a second direction; and wherein the second direction is opposite to the first direction.

12. The system of claim 11, comprising a first transceiver and a second transceiver, wherein the first transceiver comprises the first wavelength-division transmitter and the second receiver, and wherein the second transceiver comprises the second wavelength-division transmitter and the first receiver.

13. The system of claim 1, wherein the system is further configured to process the received light from the optical fiber using digital signal processing (DSP).

14. A data center optical communications system comprising a single-span transmission link, comprising:
- a wavelength-division multiplexing transmitter comprising a plurality of light sources, wherein each light source is configured to provide light;
- an optical fiber operably connected to said wavelength-division multiplexing transmitter and configured to receive light from the plurality of light sources, wherein the optical fiber has a length L of 50 km or greater, wherein the optical fiber has an absolute dispersion rate of less than 10 ps/nm/km and an attenuation rate of less than 0.17 dB/km and provides power consumption of 0.5 W to 4.5 W, wherein the optical fiber comprises a core and a cladding surrounding the core, wherein the cladding comprises a first cladding portion, a second cladding portion, and a cladding ring disposed between the first cladding portion and the second cladding portion, wherein the core of the optical fiber comprises a relative refractive index $\Delta_1$, wherein the first cladding portion of the optical fiber comprises a relative refractive index $\Delta_2$, wherein the cladding ring of the optical fiber comprises a relative refractive index $\Delta_3$, wherein the second cladding portion of the optical fiber comprises a relative refractive index $\Delta_4$, and wherein $\Delta_1 > \Delta_3 > \Delta_4 > \Delta_2$; and
- a receiver configured to receive light from the optical fiber, wherein the receiver includes a detector for detecting the light;
- wherein the wavelength-division multiplexing transmitter, the optical fiber, and the receiver are configured to transmit light unidirectionally from the wavelength-division multiplexing transmitter to the receiver via the optical fiber.

15. The system of claim 14, wherein the core comprises a radius of from about 2.2 μm to about 2.8 μm.

16. The system of claim 14, wherein the core of the optical fiber comprises a relative refractive index $\Delta_1$ of from about −0.1 to about 0.2, where:
- $\Delta_1$ comprises $(n_1-n_s)/n_s$;
- $n_1$ comprises a refractive index of the core; and
- $n_s$ comprises a refractive index of pure silica.

17. The system of claim 14, wherein the cladding of the optical fiber comprises a relative refractive index $\Delta_2$ of from about −0.4 to about −0.7, where:
- $\Delta_2$ comprises $(n_2-n_s)/n_s$;
- $n_2$ comprises a refractive index of the cladding; and
- $n_s$ comprises a refractive index of pure silica.

18. The system of claim 14, wherein the cladding ring of the optical fiber comprises a relative refractive index $\Delta_3$ of from about −0.1 to about −0.5, where:
- $\Delta_3$ comprises $(n_3-n_s)/n_s$;
- $n_3$ comprises a refractive index of the cladding ring; and
- $n_s$ comprises a refractive index of pure silica.

19. The system of claim 14, wherein the second cladding portion of the optical fiber comprises a relative refractive index $\Delta_4$ of from about −0.2 to about −0.6, where:
- $\Delta_4$ comprises $(n_4-n_s)/n_s$;
- $n_4$ comprises a refractive index of the second cladding portion; and
- $n_s$ comprises a refractive index of pure silica.

20. The system of claim 14, wherein the optical fiber comprises a cutoff wavelength of about 1500 nm or less.

21. The system of claim 14, wherein the optical fiber comprises a mode field diameter of from about 9.5 μm to about 10.5 μm.

22. The system of claim 14, wherein the optical fiber comprises an effective area of from about 70 μm² to about 80 μm².

23. An optical communications system comprising a single-span transmission link, comprising:
- a wavelength-division multiplexing transmitter comprising a plurality of light sources, wherein each light source is configured to provide light;
- an optical fiber operably connected to said wavelength-division multiplexing transmitter and configured to receive light from the plurality of light sources, wherein the optical fiber has a length L of 50 km or greater, wherein the optical fiber has an absolute dispersion rate of less than 10 ps/nm/km and an attenuation rate of less than 0.17 dB/km and provides power consumption of 0.5 W to 4.5 W; and
- a receiver configured to receive light from the optical fiber, wherein the receiver includes a detector for detecting the light;
- wherein the wavelength-division multiplexing transmitter, the optical fiber, and the receiver are configured to transmit light unidirectionally from the wavelength-division multiplexing transmitter to the receiver via the optical fiber.

* * * * *